United States Patent Office 3,502,490
Patented Mar. 24, 1970

3,502,490
HEAT AND FIRE-RESISTANT PLASTER COMPOSITIONS
Frank Ware, 12092 Chillicothe Road,
Chesterland, Ohio 44026
No Drawing. Continuation-in-part of application Ser. No. 238,861, Nov. 20, 1962. This application Jan. 15, 1968, Ser. No. 697,616
The portion of the term of the patent subsequent to Mar. 5, 1985, has been disclaimed
Int. Cl. C09d 5/14, 5/16
U.S. Cl. 106—15                    8 Claims

ABSTRACT OF THE DISCLOSURE

This invention is directed to the addition of a naturally-occurring phosphate rock or shale having a high content of phosphorus pentaoxide to a plaster composition to improve the heat and fire-resistant properties thereof.

---

This application is a continuation-in-part of co-pending application Ser. No. 238,861 filed Nov. 20, 1962 now Patent No. 3,372,040.

This invention relates to the preparation of heat and fire-resistant cementitious compositions and more specifically to heat-resistant cementitious plaster compositions. Still more specifically, the invention is directed to a method of preparing fire and heat-resistant cementitious plaster compositions by adding thereto effective amounts of a naturally-occurring phosphate rock and shale containing effective amounts of $P_2O_5$.

Various cementitious mixtures, particularly plasters comprising gypsum, may contain exfoliated vermiculite and/or perlite as insulating material and may be improved further in accordance with this invention by adding effective amounts of a naturally-occurring phosphate rock or shale as a fire-retardant. The naturally-occurring phosphate rock, which must contain a large percent of phosphorus oxide in addition to the associated elements, is effective as a retardant in construction materials, such as wallboard, lathe, acoustical or insulation plasters and the like. Normally plasters comprise cementitious materials, such as cement, lime, and/or gypsum, e.g. calcium sulfate hemi-hydrate mixed in prescribed proportions. In addition, other ingredients may be added to effect proper setting, plasticity, workability, strength, etc. Retarders may be added to inhibit the absorption of water which delays the setting action. Lime, for example, may be added to plaster to improve its workability and strength. Organic binders, surface active agents, and related materials may be added to plaster compositions in requisite amounts in order to obtain products designed for a particular use.

As distinguished from heavy masonry materials, large amounts of exfoliated perlite and/or vermiculite are being incorporated in gypsum plaster, for example, in order to provide walls, partitions, ceilings, etc., with coatings which insulate the under structures and thus provide fire protection. These fireproofing plasters may be sprayed directly to columns, beams, corrugated, flat, or cellular floors, with conventional plastering machines to protect them from high temperatures which otherwise would cause them to weaken under normal building loads. For example, the critical temperature for structural steel is approximately 1,000° F. and for the walls, floors and ceilings approximately 250° F. above room temperature. Presently structural members coated with these insulating plasters have been able to withstand the critical temperatures for periods up to about four hours by applying the plaster in thicknesses ranging up to about two inches.

However, while these insulating plasters are satisfactory for insulating the structures for a reasonable period of time, they do not completely retard the flame and are therefore inadequate at extremely high temperatures. It is known that the gypsum and Portland cement plasters when subjected to high temperatures have a tendency to lose water, which initially helps to retard the transmission of heat until all of the water is released, but subsequently they begin to harden and crack, thus exposing the structural members to the open flames.

It has been found that by using a naturally-occurring phosphate rock or shale containing an effective amount of phosphorus oxide in combination with the plaster, the plaster's effectiveness in insulating the structural members is substantially improved by reason of the phosphate ($P_2O_5$) actually retarding and extinguishing the flame. Thus, the low cost and ready availability of the naturally-occurring phosphate rock provides an excellent means of fireproofing plaster compositions.

Accordingly, it is an object of this invention to provide a new and improved cementitious or plaster composition containing an effective amount of a naturally-occurring phosphate rock or shale with large amounts of $P_2O_5$.

It is another object of this invention to provide a heat and fire-resistant plaster composition comprising a major amount of Portland cement, gypsum e.g. calcium sulfate hemi-hydrate, or mixtures thereof, and 10 to 50% by weight of a naturally-occurring phosphate rock containing about 0.25 to 40% by weight of phosphorus oxide ($P_2O_5$).

It is another object of this invention to provide a heat and a fire-resistant plaster composition containing an effective amount of an exfoliated insulating material and a naturally-occurring phosphate rock which contains 0.25 to 40% by weight of phosphorus pentoxide ($P_2O_5$).

It is still another object of this invention to provide a gypsum or calcium sulfate hemi-hydrate plaster containing in addition to adhesives, binders, dispersants, air-entraining agents, and other known plaster ingredients, a small but effective amount of a naturally-occurring phosphate rock containing a large percent of phosphorus pentoxide ($P_2O_5$).

It is a still further object of this invention to provide a method of preparing a heat and fire-resistant cementitious composition, i.e. plaster, by adding thereto an effective amount of a naturally-occurring phosphate rock and shale containing 10 to 30% by weight of phosphorus oxide ($P_2O_5$).

It is a still further object of this invention to provide a method of imparting fire-resistance and insulating properties to a cementitious or plaster composition by adding thereto effective amounts of a naturally-occurring phosphate rock and shale which comprises at least 10% by weight of $P_2O_5$, together with its associated elements.

It is a still further object of this invention to provide means of preparing cementitious or plaster containing articles, such as wallboard, lathe, and other similar building materials by adding thereto an effective amount of a naturally-occurring phosphate rock and shale, wherein the rock is characterized by containing 0.25 to 40% by weight of phosphorus oxide and associated elements.

These and other objects of the invention will become apparent by a further and more detailed description of the invention as follows:

It has been discovered that cementitious or plaster compositions of the type used in construction such as the building of churches, schools, hospitals, and the like, can be made heat and fire-resistant by adding to the compositions effective amounts of a naturally-occurring phosphate rock; said phosphate rock containing 0.25 to 40 percent by weight of $P_2O_5$ and associated elements which coact to function as a fire retardent. The presence of the $P_2O_5$-containing rock and insulating materials in the plasters prevent the transmission of heat at temperatures as high as 2,000° F. and thus is effective in protecting the structure for periods acceptable by most building codes.

The naturally-occurring phosphate rock and shale is obtained from phosphoria formations and deposits and has 0.25 to 40 percent by weight of $P_2O_5$. This rock and shale can be crushed to 10 to 350 mesh and added to the cementitous or plaster composition in the range of 10 to 50 percent by weight of the total mixture. Portland cement, gypsum i.e. calcium sulfate hemi-hydrate, and mixtures thereof wherein gypsum is present in the mixture in amounts ranging from 1.0% to 99% by weight and preferrably in excess of about 50% by weight may be combined with up to 50 percent of this naturally-occurring phosphate rock. In addition to the rock and plaster materials, other ingredients may be added depending on the ultimate use of the plaster. These may include, for example, 1.0 to 20 percent and preferably 2–12% by weight of finished lime; 0 to 50 percent by weight of an exfoliated insulating material, i.e. expanded perlite, vermiculite, and mixtures thereof; 0 to 2 percent by weight of an organic surface active agent or detergent. Either the Portland cement, gypsum, calcium sulfate, or mixtures of these materials in any proportions, may contain 10 to 50 percent by weight of the phosphate rock and shale, with small amounts of one or more of the other ingredients. The ingredients and the proportions thereof will depend of the ultimate use of the product; thus, for example, for an exterior plaster 2–12 percent by weight of lime may be used with gypsum plaster.

Other plaster compositions may comprise large amounts of Portland cement with up to 50 percent by weight of calcined gypsum, of calcium sulfate hemihydrate. Portland cement is essentially a calcium-aluminum-magnesium silicate which is prepared by combining mixtures comprising calcium carbonate and aluminum silicate and consists of approximately the following ingredients:

| | Percent by wt. |
|---|---|
| $CaO$ | 60–67 |
| $SiO_2$ | 17–25 |
| $Al_2O_3$ | 3–8 |
| $Fe_2O_3$ | 0.5–6.0 |
| $MgO$ | 0.1–5.5 |
| $Na_2O + K_2O$ | 0.5–1.3 |
| $SO_3$ | 1–3 |

The lime, used particularly for finish-coat plasters, is a hydrated lime and is obtained from calcium limestone or other naturally-occurring rocks, such as dolomite. The stone is burned in a kiln at very high temperatures to drive off moisture and separate the carbon dioxide and calcium oxide. This form of calcium oxide is known as quicklime which is partially hydrated before being used in plaster. Gypsum is a calcium sulfate dihydrate which is calcined to drive off a majority of the water of crystallization, leaving a calcium sulfate hemi-hydrate containing about one-half mole of water. However, when the calcined calcium sulfate is used in plaster, it recombines with water forming the hydrate, which causes it to harden.

In addition to the cementitous components, aggregates, and particularly the exfoliated lightweight aggregates, e.g. vermiculite and perlite, may be used in amounts ranging up to 50 percent or more of the total plaster composition.

The exfoliated aggregates will vary in particle size and proportion depending on the type and ultimate use of the composition. Large proportions of the expanded aggregates are used in the plaster or cementitious mixture for their insulating and fire-resistant properties. These materials are silicious or micaceous particles which are obtained by heat treating the ore at temperatures in excess of 1600° F., which causes them to expand to several times their original volume into a lightweight cellular product. Perlite, for example, is chemically inert and has a bulk density ranging from about 4 to 15 pounds per cubic foot. It is nonhygroscopic and contains less than one-half percent by weight of moisture. It is because of the low density and chemical inertness of the exfoliated materials that they are considered valuable as an insulating additive. The expanded particles of vermiculite and perlite have a plurality of air cells which retard or insulate the transmission of heat. The particle sizes of the exfoliated material may range up to 80 mesh or more, with the preferred size being below 50, i.e. 16 to 20 mesh.

The adhesive or binders for the plaster mixture may include organic compounds, such as gum acacia, gum karaya, gum tragacanth, dextrin, starch, glue, sodium carboxymethyl cellulose, hydroxyethyl cellulose, hydroxymethyl cellulose, gum arabic, and the various other binders which are water-dispersible or soluble resins such as polymers of ethylene oxides, polyacrylamides etc. Mixtures of polyvinyl acetate or polyvinyl chloride aqueous dispersions with other gums or binders may be added to the cementitious composition to obtain a product which can be applied by spraying, troweling, or by any other means, directly to steel or concrete structures with excellent adhension. Plaster coatings are obtained by building up of ¼ to ½ inch until thicknesses of 1 to 2 inches or more are obtained. Aqueous emulsions of polyvinyl chloride or acetate, containing up to 70 percent of water, are particularly good binders for those plasters which may be applied directly to steel beams, metal lathe, or the like.

To lower the density and to improve the wetting properties of the wet cementitious plaster, small amounts of surfactants in the range of 0.0 to 1.0 percent by weight may be used in the composition. These surfactants act as foaming agents which entrain air in the mixture as it is pumped and sprayed onto the wall surface. They have a tendency to make the finished plaster very porous and as such contribute to the effectiveness of the composition as an acoustical plaster. The surfactants are known to reduce the surface or interfacial tension between the air and aqueous phase of the ingredients and thus reduce the surface tension of the wet plaster, increasing its wetting properties.

In general, the sulfonates are known for their effectiveness in reducing the surface tension and are considered nonpolar in character but contain one group or molecular segment of high polarity, or at least a relatively high polarity. Thus, when these compounds are added to water, the polar or hydrophilic segment of the molecule tends to dissolve while the nonpolar or hydrophobic segment tends to resist going into solution. Consequently, when the surface active agent is in the air-water interphase, the hydrophobic segment projects into the polar water phase. Because of this surface activity between the polar and nonpolar phases, the surfactant orients at the interphase with the hydrophobes projecting into the gas or air phase and the hydrophils extending into the liquid, which causes foaming and improves the wetting properties of the mixture. Of the many surfactants, the anionics, such as the alkyl, aryl, alkyl aryl, or aralkyl sulfonates containing from 5 to 22 carbon atoms per molecule, are preferred. These sulfonates include, for example, the alkaline earth and alkali metal salts of benzyl sulfonic acid, dodecyl benzene sulfonic acid, alkyl toluene sulfonic acid, petroleum sulfonic acid, amyl phenyl sulfonic acid, butyl diphenyl sulfonic acid, etc. Other anionics include alkali metal tetradecyl sulfate, alkyl phenyl polyethylene glycol, sodium lauryl sulfate, heptadecyl sulfate, octyl phenyl polyethoxy ethanol, etc.

The cationic surfactants include compounds having hydrophobic groups which form cations in solution. These materials include the amines, such as quaternary ammonium compounds. Other surfactants are the nonionics which include the reaction products of either an aromatic or aliphatic alcohol with several moles of an epoxide, such as ethylene or propylene oxide. These polyoxyalkylene glycol ethers include such compounds as polyethylene glycol ether of alkyl phenol or polypropylene glycol ether of octyl phenol. Others are the aliphatic substituted ditertiary butyne and octyne diols or glycols, wherein the aliphatic substituents have from about 1 to 18 carbon atoms per molecule. One or more of these surfactants, particularly mixtures of the nonionic and cationic surfactants, such as the butyne or octynediols with the alkali metal sulfonates, e.g. lignosulfonate, can be used.

It has been found that the cementitious or plaster compositions containing the cement, gypsum, calcium sulfate hemihydrate and mixtures thereof, with or without the other additives described above, when combined with effective amounts of naturally-occurring phosphate rock and shale give a product which is heat and fireproofed. The naturally-occurring phosphate rock and shale is found in phosphoria formations and deposits in the West, or in phosphate beds or deposits in southern states, such as Florida, Tennessee, but more particularly in western states, such as Montana and Idaho. This naturally-occurring phosphate rock and shale can be pulverized to a particle size ranging from 10 to 350 mesh, preferably 50 to 100 mesh, and combined with the plaster composition in an amount ranging from 10 to 50 percent by weight.

The particle size and amount of phosphate rock used with the cementitious mixture will depend upon the $P_2O_5$ content and the ultimate use of the product. Thus, for example, where the $P_2O_5$ content is approximately 30 percent by weight of the rock, small amounts, e.g. less than 10 percent by weight of the rock can be used with the cementitious composition, whereas if smaller amounts of $P_2O_5$ are present in the rock, then larger amounts, e.g. 40 percent by weight, can be used with the cementitious composition. It is the $P_2O_5$ content of the phosphate rock which is the important factor in determining the amount needed in that the $P_2O_5$ extinguishes the flame on contact, thereby limiting thermal penetration. For example, the phosphoria as taken from the southwestern part of Montana is divided into five groups in an ascending order of sandstone dolomite, a thin phosphatic shale, a sandstone dolomite chert, an upper phosphatic shale, and a chert quartz sandstone. The upper phosphatic shale member is particularly rich in phosphate rock and shale and thus contains higher percentages of $P_2O_5$. A particular unit D contains phosphate rock comprising 10 to 20 percent of a carbonate fluoro-apatite. The mudstone of this unit may contain as much as 20 to 25 percent organic matter, about 10 percent of which is a distillable oil. Commercially, this phosphate rock is available as one or more phosphate minerals, primarily calcium phosphate, but may include phosphitized limestone, sandstone, shale, and other forms of phosphate rock. While these phosphate materials do not have a definite chemical structure, the major minerals are of the apatite group and are represented by the formula $C_{10}(PO_4CO_3)6 \cdot (FClOH)_2$ where in some instances the phosphate radical is replaced with small quantities of metal oxides and the anions, i.e. fluorine, chlorine, and hydroxyl ions, or any one alone. In addition, small quantities of calcium may be replaced by elements, such as magnesium, managanese, strontium, lead, sodium, uranium, cerium, and yttrium. Other impurities include iron as limonite, clay, aluminum phosphate, fluorine, and silica as quartz.

Particularly in the Western States, the Phosphoria formations range from 60 to 180 feet in thickness and contain yellowish or brown phosphatic shale, limestone, and oolitic phosphate rock.

Typical cementitious and plaster compositions of this invention are illustrated in the following examples. The plaster compositions may be mixed with water to obtain a wet composition having 40–60 percent by weight of water.

EXAMPLE I

| | Percent by wt. |
|---|---|
| Portland cement | 0–100 |
| Calcium sulfate or gypsum | 1.0–100 |
| Lime | 1.0–20 |
| Exfoliated insulating aggregates | 0–50 |
| Adhesive binder | 0–2 |
| Surfactant | 0–1 |
| Phosphate rock and shale | 15–50 |

EXAMPLE II

| | |
|---|---|
| Portland cement and/or gypsum | 50–90 |
| Lime | 1.0–20 |
| Exfoliated aggregate (perlite and vermiculite) | 0–50 |
| Adhesive binder | 0–2 |
| Surface active agent | 0–1 |
| Phosphate rock and shale | 15–50 |

EXAMPLE III

| | |
|---|---|
| Calcium sulfate hemi-hydrate | 50–90 |
| Lime | 1.0–20 |
| Exfoliated aggregate (perlite and vermiculite) | 0–50 |
| Adhesive binder | 0–2 |
| Surface active agent | 0–1 |
| Phosphate rock and shale | 15–50 |

EXAMPLE IV

| | |
|---|---|
| Calcium sulfate hemi-hydrate | 50–90 |
| Lime | 2–12 |
| Phosphate rock and shale | 10–50 |

EXAMPLE V

| | |
|---|---|
| Portland cement | 38–80 |
| Finished lime | 2–12 |
| Phosphate rock | 10–50 |

EXAMPLE VI

| | |
|---|---|
| Portland cement | 42 |
| Finished lime | 7 |
| Gum karaya | 0.5 |
| Alkyl aryl solium sulfonate | 0.5 |
| Exfoliated perlite (20 mesh) | 30. |
| Phosphate shale, 80 mesh (9.73% $P_2O_5$) | 20 |

EXAMPLE VII

| | |
|---|---|
| Calcium sulfate hemi-hydrate | 85 |
| Lime | 5 |
| Phosphated shale (9.73% $P_2O_5$) | 5 |
| Exfoliated perlite (16 mesh) | 5 |

EXAMPLE VIII

| | |
|---|---|
| Portland cement | 75 |
| Lime | 5 |
| Exfoliated vermiculite | 10 |
| Phosphate shale | 10 |

EXAMPLE IX

| | |
|---|---|
| Phosphate rock 31% $P_2O_5$ | 35 |
| Gypsum | 31 |
| Portland cement | 30 |
| Perlite | 2 |
| Adhesive binder | 2 |

EXAMPLE X

| | |
|---|---|
| Phosphate rock 31% $P_2O_5$ | 30 |
| Gypsum | 35 |
| Portland cement | 33 |
| Vermiculite | 1 |
| Adhesive binder | 1 |

EXAMPLE XI

| | |
|---|---|
| Phosphate rock 20% $P_2O_5$ | 45 |
| Gypsum | 20 |
| Portland cement | 31 |
| Perlite | 2 |
| Adhesive binder | 2 |

EXAMPLE XII

| | Percent by wt. |
|---|---|
| Phosphate rock 13% $P_2O_5$ | 55 |
| Gypsum | 15 |
| Portland cement | 38 |
| Perlite | 1 |
| Adhesive binder | 1 |

EXAMPLE XIII

| | |
|---|---|
| Phosphate rock 25% $P_2O_5$ | 40 |
| Gypsum | 25 |
| Portland cement | 32 |
| Perlite | 1 |
| Adhesive binder | 2 |

The phosphate rock and shale as described is a naturally-occurring form of rock which contains approximately 0.25 to 40 percent by weight of $P_2O_5$ as the essential constituent together with associated elements. The use of this rock as a heat and fire retardand is particularly important commercially in that it has a definite advantage over the use of other chemical retardants. It is substantially cheaper and is available in larger quantities. The effectiveness and the availability together with the low cost of the rock provides a means of fireproofing these cementitious plaster composition to a point beyond that which might ordinarily be expected.

In addition to utilizing the ore as it exists in its naturally-occurring state, it is possible to remove some of the heavy material which contains smaller amounts of phosphorus oxide, such as the clay, siltstone, dolomite, and silica, or any of the materials which add to the weight of the rock but contribute little phosphorus oxide and associated elements. Thus, for example, modified forms of the naturally-occurring rock can be prepared by removing clay, limestone, etc., without appreciably losing the associated metals which are responsible for the fireproofing qualities, thus making it commercially possible to use smaller amounts of a rich $P_2O_5$ rock with the cementitious product.

To illustrate the effectiveness of this rock and shale as a fire retardant in the cementitious or plaster compositions described, a specific sample of petroliferous shale having a $P_2O_5$ content of approximately 9.73 percent, together with the associated elements was used in preparing some of the above example. This sample was taken from cut "A" in section D, located in section 15, township 12, South Range 5, West Principal Meridian, Mont.

The phosphate shale, containing approximately 9.73 percent by weight of $P_2O_5$ was mixed with gypsum in ranges of 10, 25, and 50 percent by weight of the plaster, and subjected to a flame test to determine the effectiveness of the shale as a heat and fire retardant. The test comprised the application of three-eights of an inch of gypsum plaster, containing 10 percent of the shale on a ⅜ inch plaster board. The same procedure was followed in preparing ⅛ inch of plaster containing 25 percent of the shale on a ⅜ inch plaster board, and 1/16 inch of plaster containing 50 percent of the shale on wood and pressed board. The test was conducted by using a propane torch having a flame temperature in excess of 1900° C. on a 10 x 10 test area which was placed in front of the torch with the flame impinging the plastered surface. The temperature on the unexposed or reverse side of the plastered panels was determined by the time required for the heat to penetrate the plaster and char the substrate.

With the flame impinging the plaster surface, the substrate, i.e. backing of the plaster board was charred after 15 minutes, whereas the panel containing none of the phosphate shale, or the blank, was charred within approximately one minute. Thus, the test indicates the effectiveness of the $P_2O_5$ and associated elements in the naturally-occurring shale to inhibit the flame.

Additional tests were conducted by using gypsum plaster and applying it in thicknesses from ⅜ inch to 1½ inches onto an asbestos substrate. Temperatures were recorded on the reverse side of the substrate at a distance of about ½ inch away while the plastered surface was subjected to a propane flame. The gypsum plaster contained 10 percent by weight of the phosphate shale having a $P_2O_5$ content of approximately 9.7 percent by weight. Plastered panels with and without the phosphate shale were flame tested with the following results.

| Plaster thickness | Gypsum plaster temperature after ½ hr. (°F.) | Gypsum plaster 10% Phosphate Shale Temperature after 6 hrs. (°F.) |
|---|---|---|
| ⅜ inch | 400 | 176 |
| ¾ inch | 400 | 139 |
| 1 inch | 400 | 109 |
| 1½ inches | 400 | 87 |

It should be noted from the above tests that the gypsum plaster in thicknesses of ⅜ to 1½ inches gave temperature readings of 400° F. approximately one-half hour after the surfact had been heated by the flame, whereas those samples which contained ten percent by weight of the phosphate shale did not exceed 176° F. The surface of the shale-containing plaster, after the test, had a vitreous appearance but did not crack and crumble as did the samples which did not contain the phosphate shale. This indicates that even at extreme temperatures the $P_2O_5$ and associated elements in the phosphate shale effectively retard the transfer of heat and cause the plaster to harden and take on a stone-like appearance.

The fire-resistant cementitious mixtures or compositions, such as gypsum plasters containing perlite, lime, or any of the other ingredients, also may be used to prepare heat and fire-resistant wallboard merely by depositing the plaster between paper liners and permitting it to set. These cementitious compositions may be modified further by the addition of other known additives, such as bentonite, and fibrous materials, e.g. asbestos or glass-wool, which improve both the strength and fire-resistance of the composition. In addition to the vermiculite and perlite, various forms of exfoliated mica, such as kerite, maconite, etc., may be used, together with surfacing materials, such as chalk, whiting, china clay, lithopone, and various combinations thereof.

In instances where synthetic gypsum is employed, it is desirable to add small but effective amounts of aluminum sulfate as the crystallizing agent which helps to improve the hardening characteristics of the plaster. To help disperse the phosphate ore in the plaster composition it may be desirable to employ an acid e.g. up to 3.0% of sulphuric acid as a dispersing aid. To improve the workability of the final plaster composition with respect to applying and spreading etc. it may be desirable to add a small amount of a basic constituent e.g. ammonia in amounts up to about 3% to lower the pH of the plaster in an aqueous medium.

What is claimed is:

1. A fire-resistant plaster composition consisting essentially of (1) a cementitious material selected from the group consisting of gypsum and mixtures of Portland cement and gypsum wherein the gypsum is present in the mixture in amounts ranging from 1–99% by weight; (2) about 10 to 50% by weight of a natural-occurring phosphate rock containing about 0.25% to 40% by weight of $P_2O_5$ and having a particle size ranging from about 10–350 mesh; (3) 1.0 to 20% by weight of lime; (4) 0 to 50% by weight of an exfoliated material selected from the group consisting of vermiculite, perlite, and mixtures thereof; (5) 0 to 2.0% by weight of an organic adhesive-binder; (6) and 0 to 1.0% by weight of an organic surface-active agent.

2. The composition of claim 1 further characterized in that the adhesive-binder is a gum selected from the group consisting of gum acacia, gum karaya, gum tragacanth, gum arabic, and mixtures thereof.

3. The composition of claim 1 further characterized in that the adhesive-binder is a cellulose compound selected from the group consisting of sodium carboxymethyl cellulose, hydroxyethyl cellulose, hydroxymethyl cellulose and mixtures thereof.

4. The composition of claim 1 further characterized in that the adhesive-binder comprises a synthetic resin selected from the group consisting of polyvinyl acetate, polyvinyl chloride and mixtures thereof.

5. The composition of claim 1 further characterized in that the surface-active agent is selected from the group consisting of alkali and alkaline earth metal sulfonates having 5–22 carbon atoms per molecule, polyoxyalkylene glycol ethers and cationic amines.

6. The composition of claim 1 further characterized in that the cementitious material is gypsum and the lime is present in an amount ranging from 2–12% by weight.

7. The composition of claim 1 further characterized in that the cementitious material is a mixture of gypsum and Portland cement.

8. A fire-resistant plaster composition consisting essentially of (1) a cementitious material selected from the group consisting of gypsum and mixtures of Portland cement and gypsum wherein the gypsum is present in the mixture in amounts ranging from 1–99% by weight; (2) about 10 to 50% by weight of a natural-occurring phosphate rock containing about 0.25% to 40% by weight of $P_2O_5$ and having a particle size ranging from about 10–350 mesh; (3) 1.0 to 20% by weight of lime; (4) 0 to 50% by weight of an exfoliated material selected from the group consisting of vermiculite, perlite, and mixtures thereof; (5) 0 to 2.0% by weight of an organic adhesive-binder; (6) 0 to 1.0% by weight of an organic surface-active agent; and (7) 40 to 60% by weight of water.

References Cited

UNITED STATES PATENTS

| | | | |
|---|---|---|---|
| 878,912 | 2/1908 | Timofeef | 106—109 |
| 1,937,292 | 11/1933 | Moore | 106—110 |
| 2,090,625 | 8/1937 | Edwards | 106—109 |
| 2,272,576 | 2/1942 | Penn | 99—232 |
| 2,303,463 | 12/1942 | Horne | 106—109 |
| 2,632,743 | 3/1953 | Eckert | 260—17.3 |
| 3,249,534 | 5/1966 | Ware. | |
| 3,372,040 | 3/1968 | Ware | 106—15 |

FOREIGN PATENTS 500,416   2/1939   Great Britain.

OTHER REFERENCES

A.S.T.M. Designation: C150–56; pages 1–3.

JULIUS FROME, Primary Examiner

JOAN B. EVANS, Assistant Examiner

U.S. Cl. X.R.

106—90, 91, 93, 97, 111, 113, 115, 119, 177, 193, 209; 117—137; 252—8.1; 260—41